United States Patent Office 3,442,320
Patented May 6, 1969

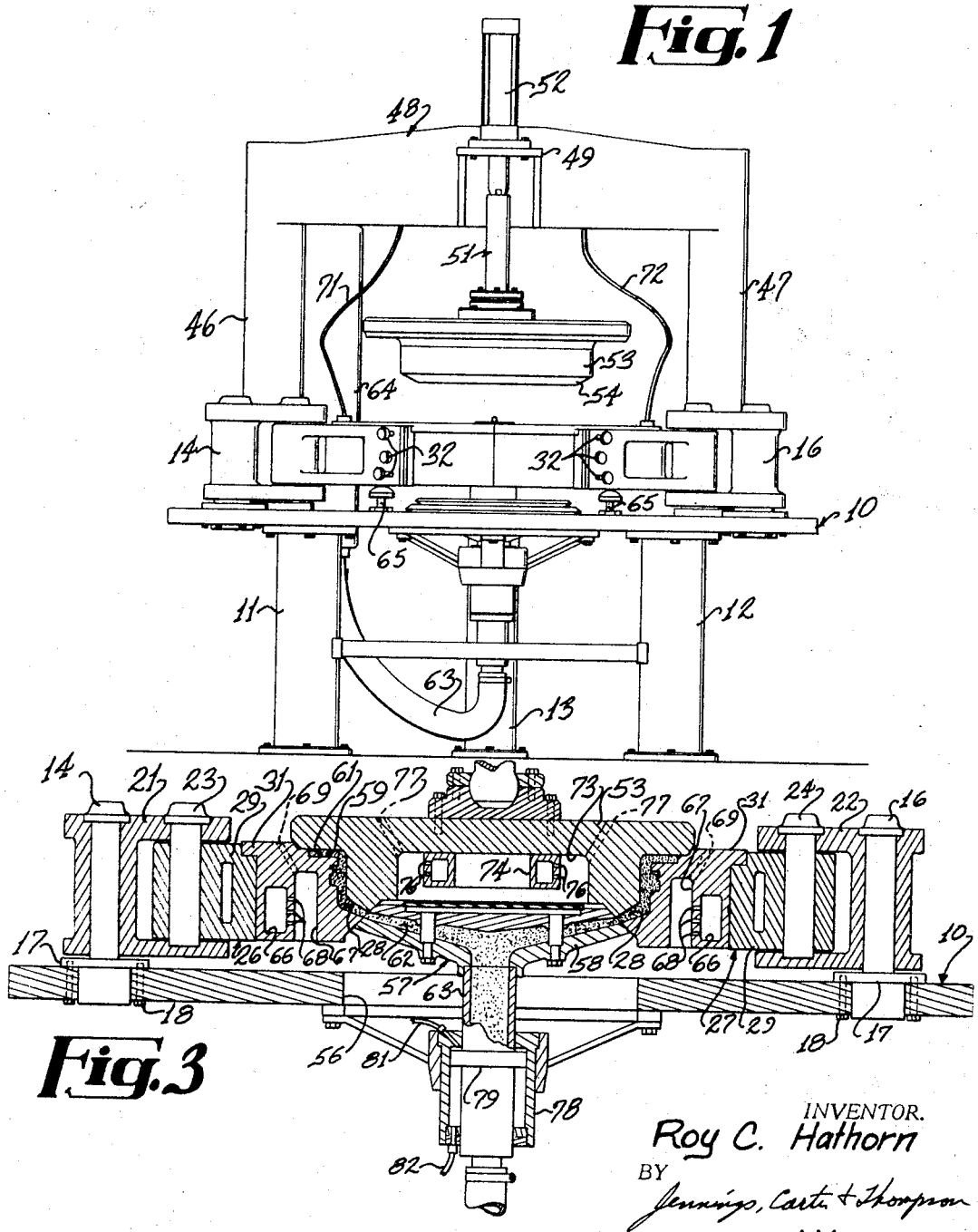

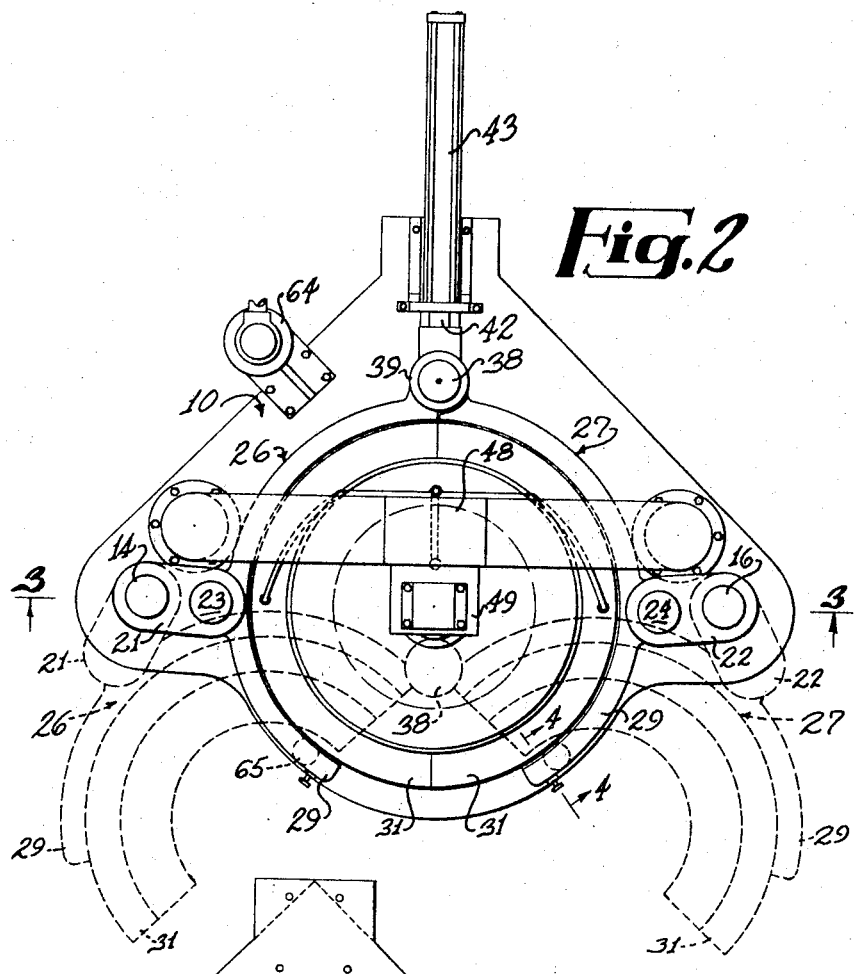
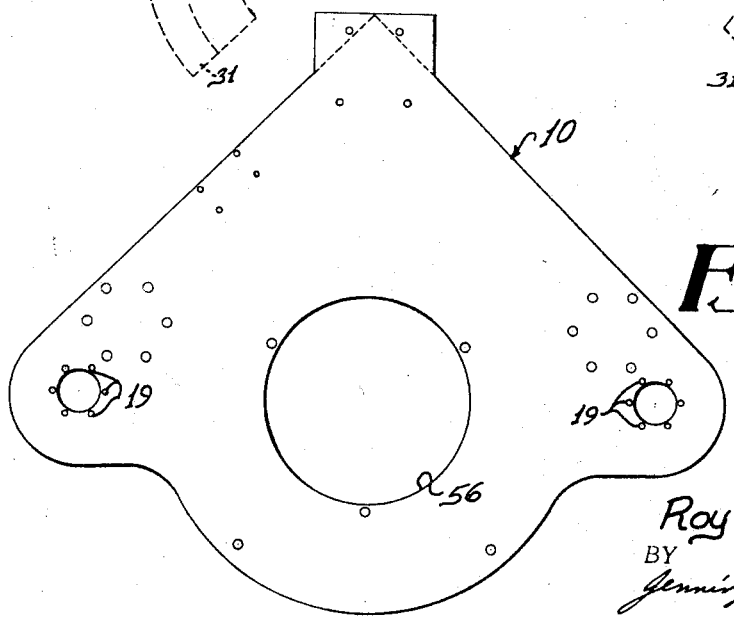

3,442,320
APPARATUS FOR MAKING SHELL CORE AND
MOLD PRODUCTS
Roy C. Hathorn, 1309 Kilby Terrace,
Anniston, Ala. 36201
Filed Aug. 16, 1966, Ser. No. 572,857
Int. Cl. B22c 13/08, 13/12, 15/22
U.S. Cl. 164—165                                   5 Claims

ABSTRACT OF THE DISCLOSURE

A split core box having a pair of cooperating, semi-annular sections with mold cavities therein. The sections are pivotally connected to each other and are supported by a base plate. Toggle links are provided between the mold sections and the base plate whereby the mold sections are rotated selectively from a forming position to a release position whereupon the product is actually presented to the operator or is dropped onto a conveyor.

This invention relates to apparatus for making shell core and mold products and more particularly to such apparatus which shall embody a split core box having a pair of cooperating sections with outwardly flaring cavities therein which cooperate with a mandrel to define a mold cavity.

An object of my invention is to provide apparatus of the character designated in which the cooperating sections of the core box are pivotally connected to each other and are supported by a base plate which provides a very sturdy support.

Another object of my invention is to provide apparatus for making shell core and mold products of the character designated in which the bearings for the apparatus do not have to take the force of the ram which forces the mandrel toward the core box.

A further object of my invention is to provide apparatus for making shell core and mold products in which the core box is made up of concentric parts whereby all parts may be made in one operation in a lathe, thus assuring that the parts remain in alignment with each other during use.

A further object of my invention is to provide apparatus of the character designated in which the core box may be changed in a minium of time by unskilled labor to thus vary the size and shape of the core box employed.

A further object of my invention is to provide apparatus for making shell core and mold products of the character designated in which improved means is provided for moving the semi-annular sections of the core box from a first position for forming the product to a second position to release the product.

A still further object of my invention is to provide apparatus for making shell core and mold products which shall be simple of construction, economical of manufacture and one in which the base plate serves as a guard to prevent the operator from entering the apparatus.

As is well known in the art to which my invention relates, difficulties have been encountered in the use of split mold boxes due to the fact that no effective means has been provided for supporting the movable sections as they are moved from the mold's forming position to a position to release the product. Also, difficulties have been encountered in moving the mold sections relative to each other since the sections have been moved by a reciprocatory motion on a shaft rather than by a rotary motion.

Figure 4:
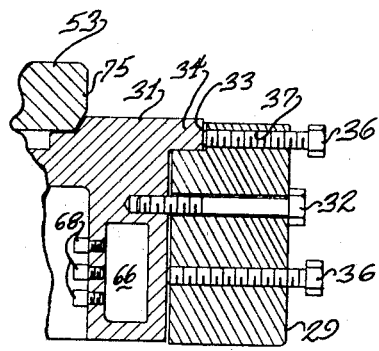

Apparatus embodying features of my invention is illustrated in the accompanying drawings, forming a part of this application, in which:

FIG. 1 is a front elevational view of the apparatus;
FIG. 2 is a top plan view of the apparatus shown in FIG. 1;
FIG. 3 is an enlarged, sectional view taken generally along the line 3—3 of FIG. 2;
FIG. 4 is a enlarged, sectional view taken generally along the line 4—4 of FIG. 2;
FIG. 5 is a plan view of the base plate removed from the remainder of the apparatus; and
FIG. 6 is a side elevational view of the apparatus.

Figure 6:
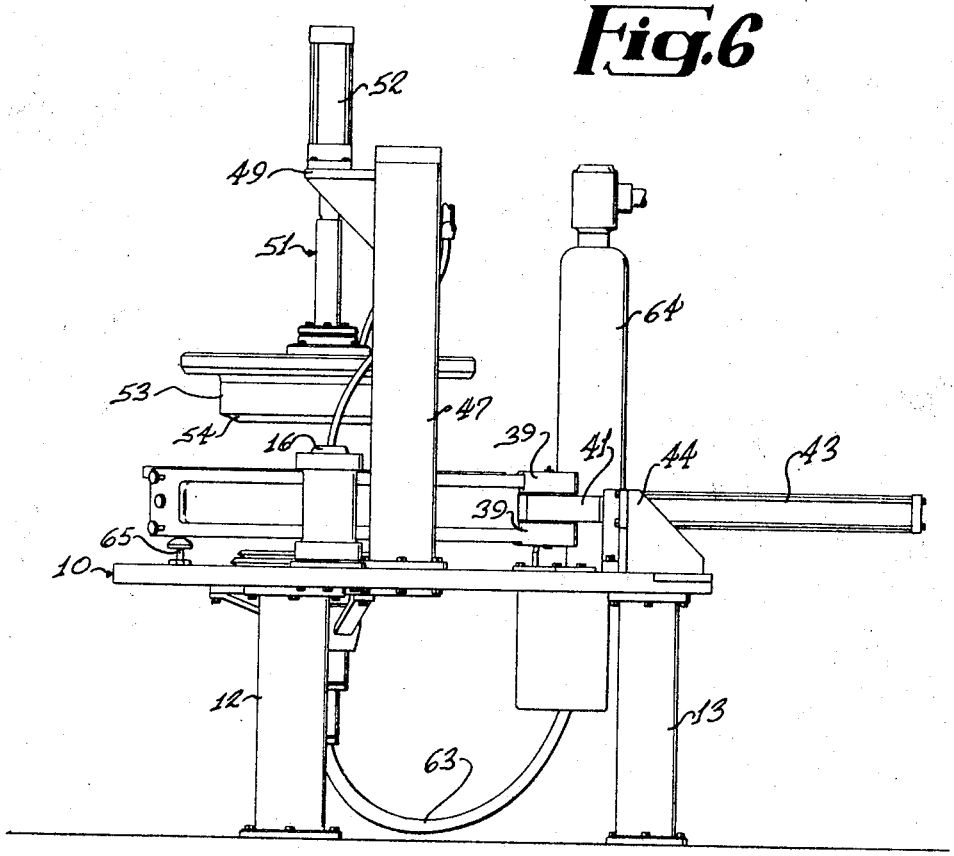

Referring now to the drawings for a better understanding of my invention, I show a base plate 10 which comprises a relatively thick metal plate as shown in FIGS. 1 and 6. The base plate 10 is supported by front legs 11 and 12 and a rear leg 13, as shown.

Secured to and projecting upwardly from opposite sides of the base plate 10 are pivot pins 14 and 16. As shown in FIG. 3, the lower end of each pin 14 and 16 is secured to a plate 17 which in turn is secured to the base plate 10 by retaining bolts 18 that pass through suitable openings 19 provided in the base plate. One end of a link 21 is pivotally connected to the pin 14 and one end of a link 22 is pivotally connected to the pin 16, as shown in FIGS. 2 and 3. The other ends of the links 21 and 22 are pivotally connected by pins 23 and 24, respectively, to semi-annular sections 26 and 27 which define a split core box. Each of the semi-annular sections 26 and 27 is provided with an outwardly flaring mold cavity 28 therein which may be of various shapes. Preferably, each of the semi-annular sections 26 and 27 comprises an outer portion 29 which is pivotally connected to pins 23 and 24 and an inner portion 31 which is provided with the cavity 28 therein. The inner portions 31 are adjustably connected to the outer portions 29 by cap screws 32, as shown in FIG. 4. An arcuate recess 33 is provided in each outer portion 29 in position to receive an arcuate projection 34 carried by the adjacent inner portion 31. To further align the inner portion relative to the outer portion, jack screws 36 are mounted in threaded openings 37 in the outer portion 29 in position to bear against adjacent surfaces of the inner portion 31.

The semi-annular sections 26 and 27 are pivotally connected to each other at one side of the mold box by a pivot pin 38. As shown in FIGS. 2 and 6, annular spaced apart bearing members 39 are carried by the abutting ends of the sections 26 and 27 in position to receive the pin 38. Pivotally connected to the pin 38 between the bearing members 39, as shown in FIG. 6, is an annular bearing member 41 which is connected to one end of the piston rod 42 of a fluid pressure operated cylinder 43. The cylinder 43 is mounted on a supporting bracket 44 carried by the base plate 10, as shown. Accordingly, as fluid under pressure is introduced adjacent opposite ends of the cylinder 43, the piston rod 42 is moved inwardly and outwardly of the cylinder 43 to thus move the pivot pin 38 from the solid line position shown in FIG. 2 to the dotted line position. That is, the mold sections 26 and 27 are moved from the mold forming or solid line position to the release or dotted line position.

Secured to the base plate 10 at opposite sides of the core box are upstanding legs 46 and 47 which support a transverse member 48, as shown in FIG. 1. Mounted on and projecting forwardly of the transverse member 48 is a support bracket 49 which carries a vertical ram 51 that is actuated by a fluid pressure operated cylinder 52. Mounted at the lower end of the ram 51 is a mandrel 53 which is of a shape to enter the core box with the outer surface of the mandrel being in spaced relation to the cavity 28 in the semi-circular sections 26 and 27 of the core box. The ram 51 is raised and lowered in a manner well understood in the art by introducing fluid under pressure at opposite ends of the cylinder 52. As shown in FIGS. 1 and 6, the lower end of the mandrel 53 is beveled whereby it slopes downwardly and inwardly at 54 to facilitate movement of the mandrel into the core box.

As shown in FIG. 5, the base plate 10 is provided with a centrally disposed opening 56 for receiving a blow plate indicated generally at 57. The blow plate proper is indicated at 58 and is of a shape to engage the under surface of the mandrel 51 and an adjacent portion of the core box sections 26 and 27 to define a chamber 59 for receiving a moldable material 61, such as a resin coated sand. The blow plate proper 58 is provided with a sand delivery passageway 62 therein which communicates with the chamber 58, as shown in FIG. 3. The lower end of the passageway 62 communicates with a sand delivery conduit 63 which in turn communicates with a sand chamber 64 whereby sand is supplied in a manner well understood in the art.

To limit downward movement of the base plate 10 as the ram 51 moves downward, I provide upstanding projections 65 on the base plate 10 in position to engage the undersurface of the sections 26 and 27 upon a predetermined amount of movement of the core box toward the base plate.

The sections 26 and 27 of the core box are heated by suitable means, such as by supplying a combustible mixture into semi-annular passageways 66 which communicate with each other when the sections 26 and 27 are in the solid line position shown in FIG. 2. Semi-annular passageways 67 are provided in the sections 26 and 27 inwardly of the passageways 66 to define a partition 70 therebetween, as shown in FIG. 3. A series of burner tips 68 are provided in the partition 70 between the passageways 66 and 67 whereby the combustible mixture may be burned in the chamber 67 to heat the core box. Suitable vents 69 are provided in the sections 26 and 27 for removing the products of combustion. The combustible mixture is applied to the semi-annular passageway 66 by suitable conduits 71 and 72.

The mandrel 51 is also heated by suitable means, such as by providing a centrally disposed opening 73 in the lower portion of the mandrel. An annular gas manifold 74 is provided within the chamber 73, as shown in FIG. 3. A plurality of burner tips 76 are provided in the manifold 74 for introducing a combustible gas mixture into the chamber 73. The products of combustion are vented from the chamber 73 by suitable vents 76 also, suitable vents 75 are provided between the mandrel 53 and the sections of the core box.

The blow plate 58 is connected to the sand delivery conduit 63 and is moved toward and away from the mandrel 53 and the adjacent portions of the core box by suitable means, such as a fluid pressure operated cylinder 78 which encases a piston 79 which in turn is mounted on a sand delivery conduit 63, as shown in FIG. 3. Fluid under pressure is introduced into opposite ends of the cylinder 78 by suitable supply conduits 81 and 82.

From the foregoing description, the operation of my improved apparatus for making shell core and mold products will be readily understood. The hydraulic cylinder 43 is actuated to move the pivot pin 38 and the semi-annular sections 26 and 27 connected thereto to the solid line position shown in FIG. 2. The ram 51 is lowered to position the mandrel 53 within the core box, as shown in FIG. 3 and the blow plate assembly 57 is elevated by introducing fluid under pressure through conduit 82 to thus position the sand delivery passageway 62 in alignment with the chamber 59. Sand is then delivered under pressure from chamber 64 through conduit 63. After the moldable material, such as sand, has been introduced into the chamber 59 defined between the core box and the mandrel 53, the material is cured by the heat generated within the core box and the mandrel 53, by burning the combustible mixture therein. While I have shown the heating means as being in the form of a combustible mixture, it will be apparent that other suitable heating means may be employed, such as by employing electrical heating elements within the core box and the mandrel.

After the product has been cured, the ram 51 is elevated to remove the mandrel 53 from the core box. The fluid pressure operated cylinder 43 is then actuated to move the pivot pin 38 from the solid line position to the dotted line position shown in FIG. 2 whereupon the product is presented to the operator or may be delivered onto a suitable conveyor or the like, not shown. The apparatus is then ready for another cycle of operation.

From the foregoing, it will be seen that I have devised an improved apparatus for making shell core and mold products. By providing a base plate for supporting the semi-annular sections of the core box, together with upstanding projections which limit downward movement of the core box, the supporting bearings for the core box are not subjected to excessive loads. Also, by providing a toggle linkage between the core box sections and the base plate, together with a pivotal connection between the sections, the sections may be readily rotated from operating position to release position by merely actuating the control cylinder 43. Furthermore, by providing apparatus wherein the parts thereof form concentric members, the parts may be machined in one operation whereby accurate alignment is provided after installation.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

I claim:

1. In apparatus for making shell core and mold products,
   (a) a supporting base plate,
   (b) a split core box having a pair of cooperating sections with mold cavities therein,
   (c) means pivotally connecting said sections to each other at one side of said core box for pivotal movement from a first position for forming said product to a second position to release said product,
   (d) a first link pivotally connected at one end thereof to said base plate with the other end thereof pivotally connected to one of said sections in position to move the section connected thereto selectively from said first position to said second position in response to pivotal movement of said sections relative to each other,
   (e) a second link pivotally connected at one end thereof to said base plate with the other end thereof pivotally connected to the other of said sections in position to move the section connected thereto selectively from said first position to said second position upon pivotal movement of said sections relative to each other,
   (f) actuating means operatively connected to said sections to pivot said sections selectively from said first position to said second position,
   (g) a mandrel adapted to enter said core box with the outer surface of said mandrel in spaced relation to said cavities,
   (h) means to move said mandrel and core box relative to each other whereby said mandrel is positioned selectively within said core box and outwardly of said core box,
   (i) a blow plate mounted opposite said mandrel in position to introduce a moldable material into the cavity defined between said core box and said mandrel while said mandrel is within said core box, and (j) means to cure said moldable material in said core box.

2. In apparatus for making shell core and mold products as defined in claim 1 in which outwardly projecting limit members are mounted on said base plate in position to engage said core box upon a predetermined amount of movement of said core box toward said base plate.

3. In apparatus for making shell core and mold products as defined in claim 1 in which the cooperating sections of the core box are semi-annular.

4. In apparatus for making shell core and mold products as defined in claim 1 in which the actuating means comprises a fluid pressure operated cylinder operatively connected to the pivotal connection between the cooperating sections of the core box.

5. In apparatus for making shell core and mold products as defined in claim 1 in which the blow plate is movable toward and away from said core box and mandrel.

References Cited

UNITED STATES PATENTS

| | | |
|---|---|---|
| 2,744,358 | 5/1956 | Rowe _____ 65—360 X |
| 2,757,485 | 8/1956 | Fedevich _____ 65—360 X |
| 2,903,742 | 9/1959 | Barefoot. |
| 2,995,776 | 8/1961 | Giardini et al. _____ 18—16.5 |
| 3,060,506 | 10/1962 | Uschmann _____ 18—16.5 |
| 3,212,129 | 10/1965 | Craig et al. |

FOREIGN PATENTS 230,616   4/1963   Austria.

J. SPENCER OVERHOLSER, *Primary Examiner.*

EUGENE MAR, *Assistant Examiner.*

U.S. Cl. X.R.

65—358, 360; 164—186, 201, 228; 249—162